Nov. 30, 1954     N. R. KRAUSE ET AL     2,695,485
DRIVE FOR HARVESTER-THRESHER
Original Filed April 7, 1942     6 Sheets-Sheet 5

Inventor
NORMAN R. KRAUSE
SHERMAN C. HETH
By Emerson B Donnell
Attorney

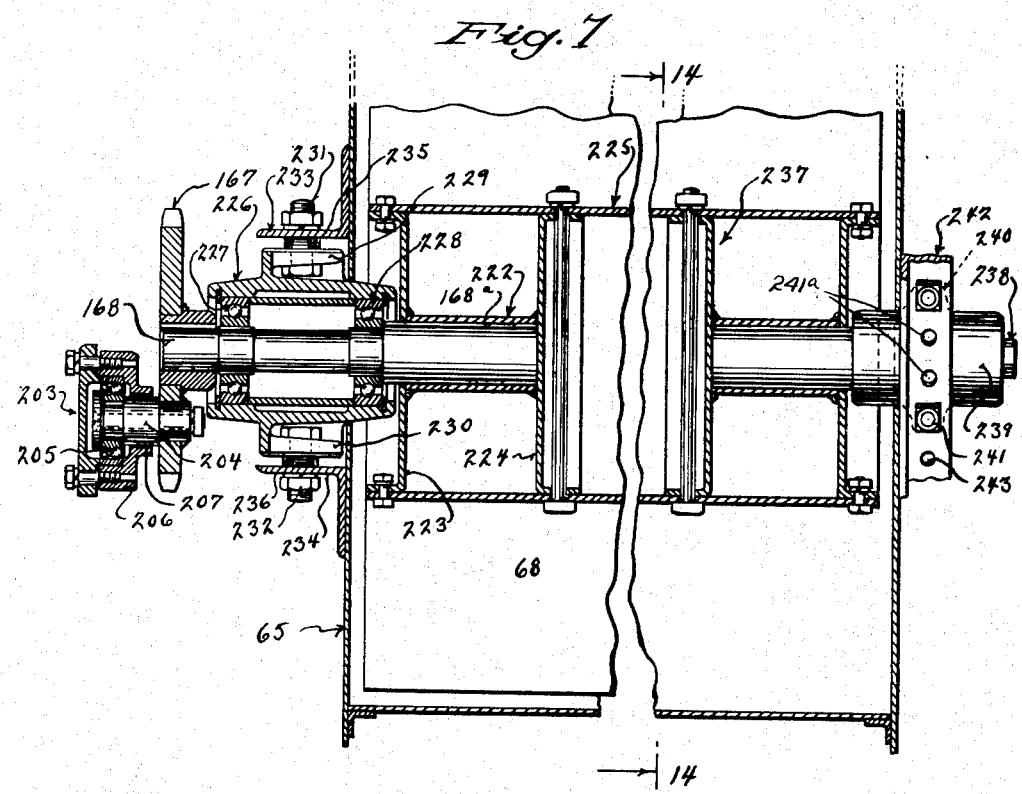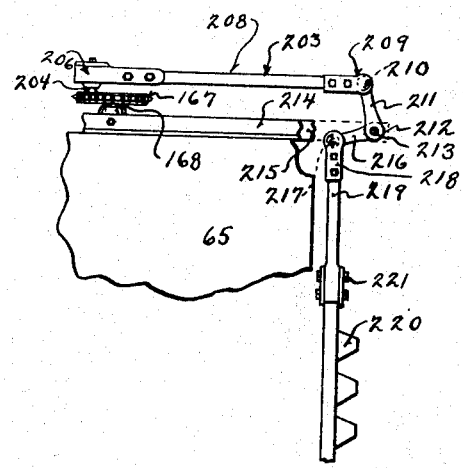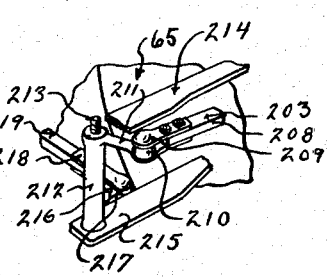

United States Patent Office 2,695,485
Patented Nov. 30, 1954

2,695,485

DRIVE FOR HARVESTER-THRESHER

Norman R. Krause and Sherman C. Heth, Racine, Wis., assignors to J. I. Case Company, Racine, Wis., a corporation of Wisconsin Original application April 7, 1942, Serial No. 438,014. Divided and this application December 11, 1948, Serial No. 64,823

6 Claims. (Cl. 56—21)

The present invention relates to harvesting machines and more particularly to machines for cutting and threshing grains as a single operation, commonly known as combination harvester threshers or "combines," this application being a division of the application of Krause et al., Serial No. 438,014, filed April 7, 1942, and now abandoned.

An object of the invention is to generally improve the construction and operation of machines of this class.

Further objects are to provide an improved sickle drive; improved subcombinations of the general machine structure and other expedients looking toward a realization of the above objects.

A further object is to provide a novel driving organization for such a machine resulting in extreme reliability, and economy in manufacture and maintenance.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention as herein expressed.

Fig. 7 is a vertical sectional view on the line 7—7 of Fig. 2, slightly enlarged.

Fig. 8 is a plan view of certain mechanism indicated in Figs. 3 and 7, slightly enlarged with respect to Fig. 3 and slightly reduced in size with respect to Fig. 7.

Fig. 9 is a perspective view with parts broken away of a portion of the mechanism indicated in Fig. 8, slightly enlarged.

Figure 1:
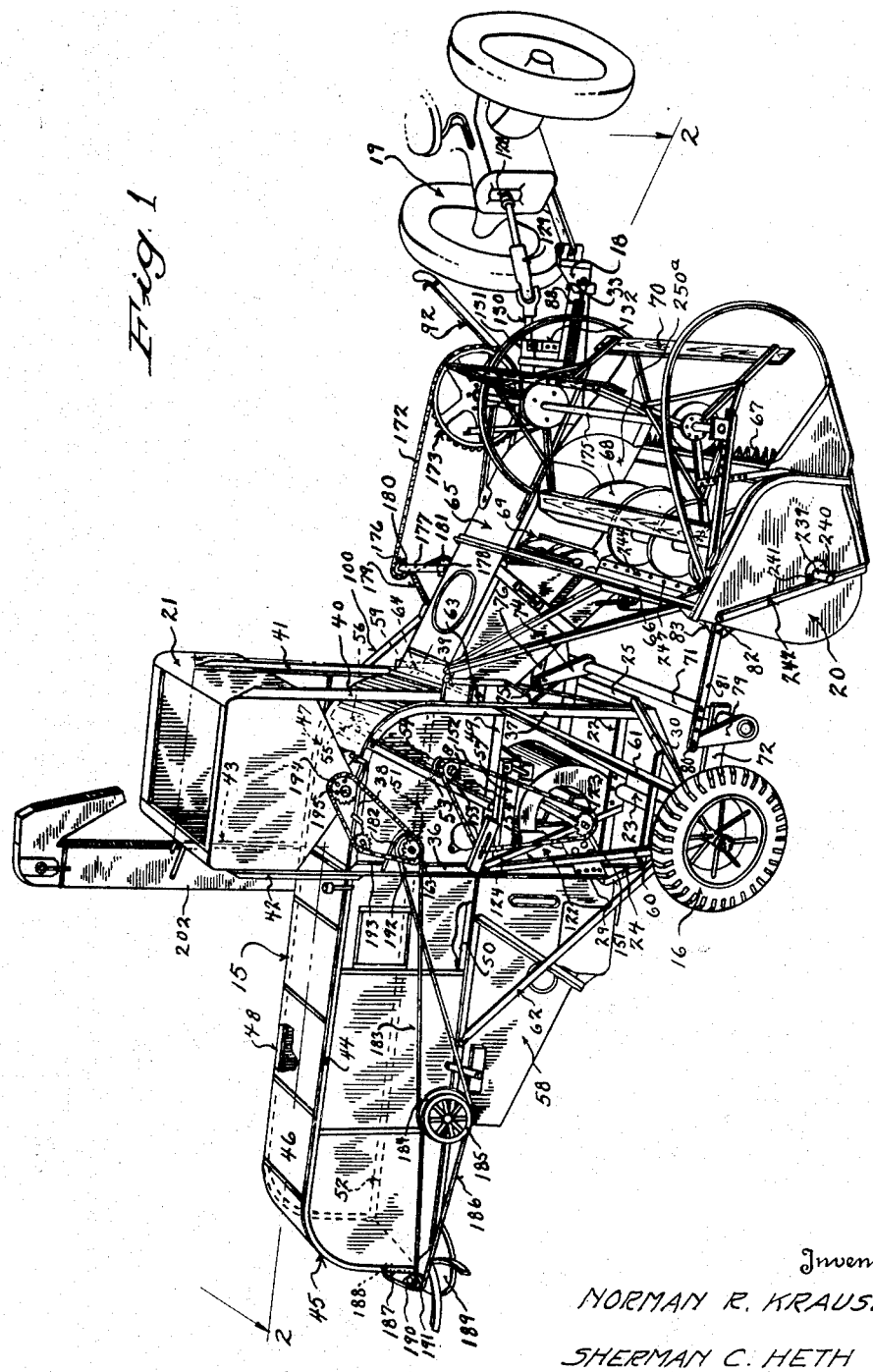
Figure 1 is a perspective view taken from above and to the right of the illustrative machine embodying the invention.
Figure 2:
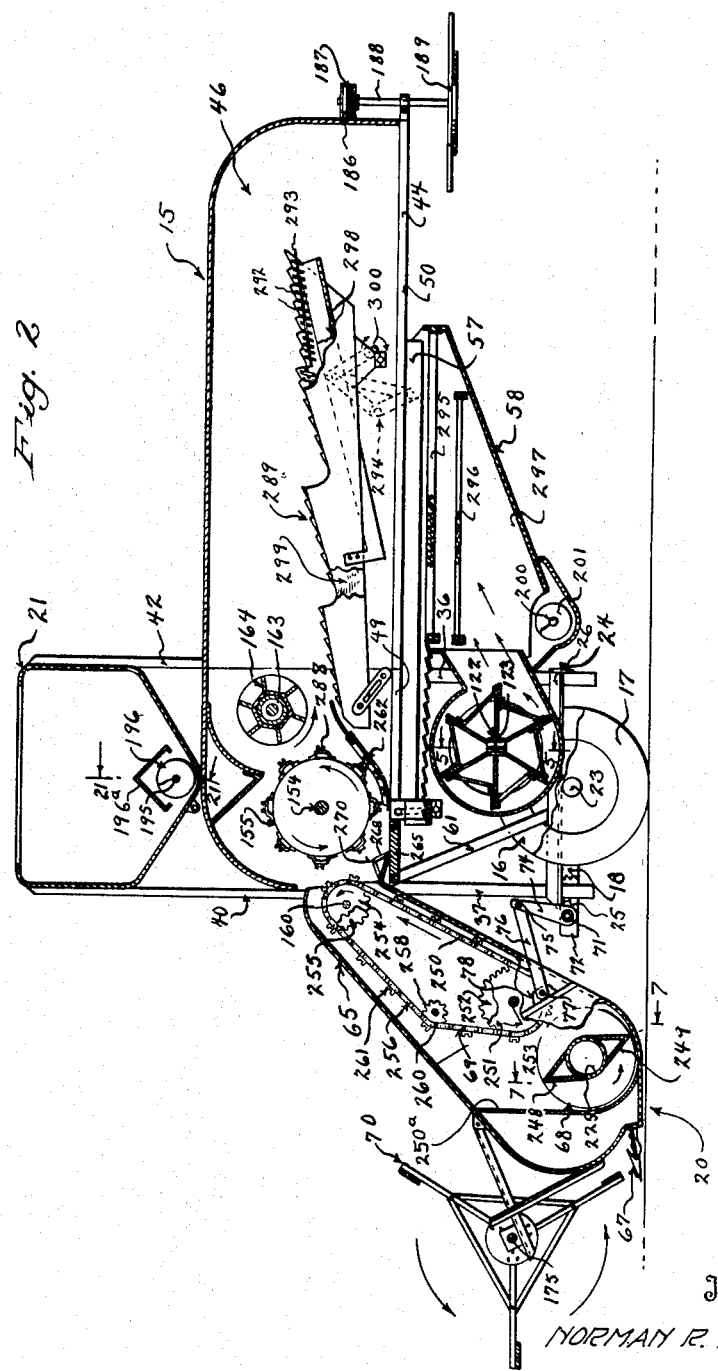
Fig. 2 is a sectional left side elevation of the machine shown in Fig. 1, slightly enlarged, with parts removed to show the interior.

As seen in Fig. 1, the machine constituting the illustrative embodiment comprises a main body portion generally designated as 15 constituting the thresher part supported on wheels as 16 and 17 (see also Fig. 2). The machine is propelled by a draw bar 18 connected in any suitable or well-known manner with a tractor generally designated as 19 of any suitable or well-known construction. Body portion 15 also carries a harvester portion or auger trough generally designated as 20 supported from body portion 15 as will appear and a grain bin generally designated as 21 for receiving a crop as it is harvested. An engine 22, Fig. 4, may be carried by the machine for actuating the mechanism thereof while under certain conditions engine 22 may be dispensed with as will appear and the mechanism may be operated from a power source on the tractor.

While a specific embodiment of the machine has been shown and described in specific terms, it is to be understood that sprockets and chains, for example, might be replaced by pulleys and belts, or other equivalent expedients within the contemplation of the invention, and the use of the terms sprockets and chains or any other specific terms in this description, is not intended to limit the invention to such specific construction or in any manner.

The machine in the present illustrative embodiment is balanced or substantially balanced over an axle 23 carried by above mentioned wheels 16 and 17. Axle 23 has a base element generally designated as 24 fixed therewith and comprising a roughly rectangular frame intersected by above mentioned draw bar 18.

Extending upwardly from base member 24 in the present instance are four uprights, columns, or struts, 34, 35, 36 and 37, base member 24 and uprights 34, 35, 36 and 37 together forming a very stable upstanding frame-work from which the major elements of the combine may be conveniently supported.

Body portion 15 comprises for the most part the threshing and separating portion of the combine which is located generally to the rear of the frame-work defined by base portion 24 and uprights 34, 35, 36 and 37.

A frame member 49 extends substantially horizontally between uprights 36 and 37 substantially at the desired level of the bottom of a separator housing 46 and a member 50 extends rearwardly from member 49 to define the lower margin of separator housing 46. In similar manner a member 51 extends between above mentioned uprights 35 and 34 and a member 52 extends rearwardly from member 51.

In the present instance an upwardly extending diagonal member 53 is carried by member 49 and portion 38, and serves as a support for a cylinder bearing generally designated as 54. In similar manner a member 55 extends between member 51 and portion 47 and serves as a support for a cylinder bearing 56.

As will be understood, the usual grain pan 57 and cleaning shoe 58 are carried by above mentioned members 49, 50, 51 and 52 as is separator housing 46. A harvester pivot plate or support 59 similar to a support 39 carried by upright 35 and from which header portion 20 is suspended as will appear. It will thus be apparent that in general the major parts of the machine are carried from above mentioned uprights 34, 35, 36 and 37 and base portion 24.

The support for header 20 is as follows. Pivot bearings 63 and 64 are carried respectively by plates 39 and 59, as above set forth, and pivotally support a feeder house 65 generally rectangular in cross-section and preferably, although not necessarily, of gradually increasing depth forwardly of bearings 63 and 64. Feeder house 65 extends forwardly and downwardly, and in the present instance is rigidly connected with an auger trough or cross conveyor housing 66. Housing 66 extends laterally, in the present instance to the right of housing 65, the two comprising a substantially rigid harvester unit extending forwardly of the central portion constituted by uprights 34 to 37 and substantially balancing the rearwardly overhanging portion 45 of separator housing 15. Cross conveyor housing 66 in the present instance comprises a trough-like element open at the front of the combine and having a cutter bar generally designated as 67 carried by the lower forward edge thereof and within which rotates an auger conveyor generally designated as 68. Suitable conveying means generally designated as 69 is disposed within feeder house 65 and a reel generally designated as 70 is carried by trough portion 66. The structure thus far described would normally pivot downwardly about pivot bearings 63 and 64 so that the forward portion in the neighborhood of cutter bar 67 would rest upon the ground. In the present instance the weight of harvester 20 is transmitted back to the framing through a torque tube or element 71 journaled at or near one end in a bracket or strut 72 extending forwardly from axle 23 and at the other end in a suitable bearing 73, Fig. 3 on draw bar 18.

Torque tube 71 has an upwardly extending arm 74 pivoted at 75 to a link 76 pivoted at 77 to a bearing or bracket 78 suitably fixed with a portion of feeder house 65. In similar manner an arm 79, Fig. 1, extends upwardly from torque tube 71 in the neighborhood of bracket 72 and is pivotally connected at 80 with a link 81 pivotally connected at 82 with a bracket or bearing 83 fixed with auger trough 66. It will now be apparent that the reaction of the weight of harvester 20 will be exerted backwardly against links 81 and 76 and forwardly against bearings 63 and 64, thereby tending to rotate the whole combine structure, about axle 23 as a pivot, in a clockwise direction, thus tending to counterbalance the tendency of separator portion 15 to cause similar rotation in a counterclockwise direction.

Figure 3:
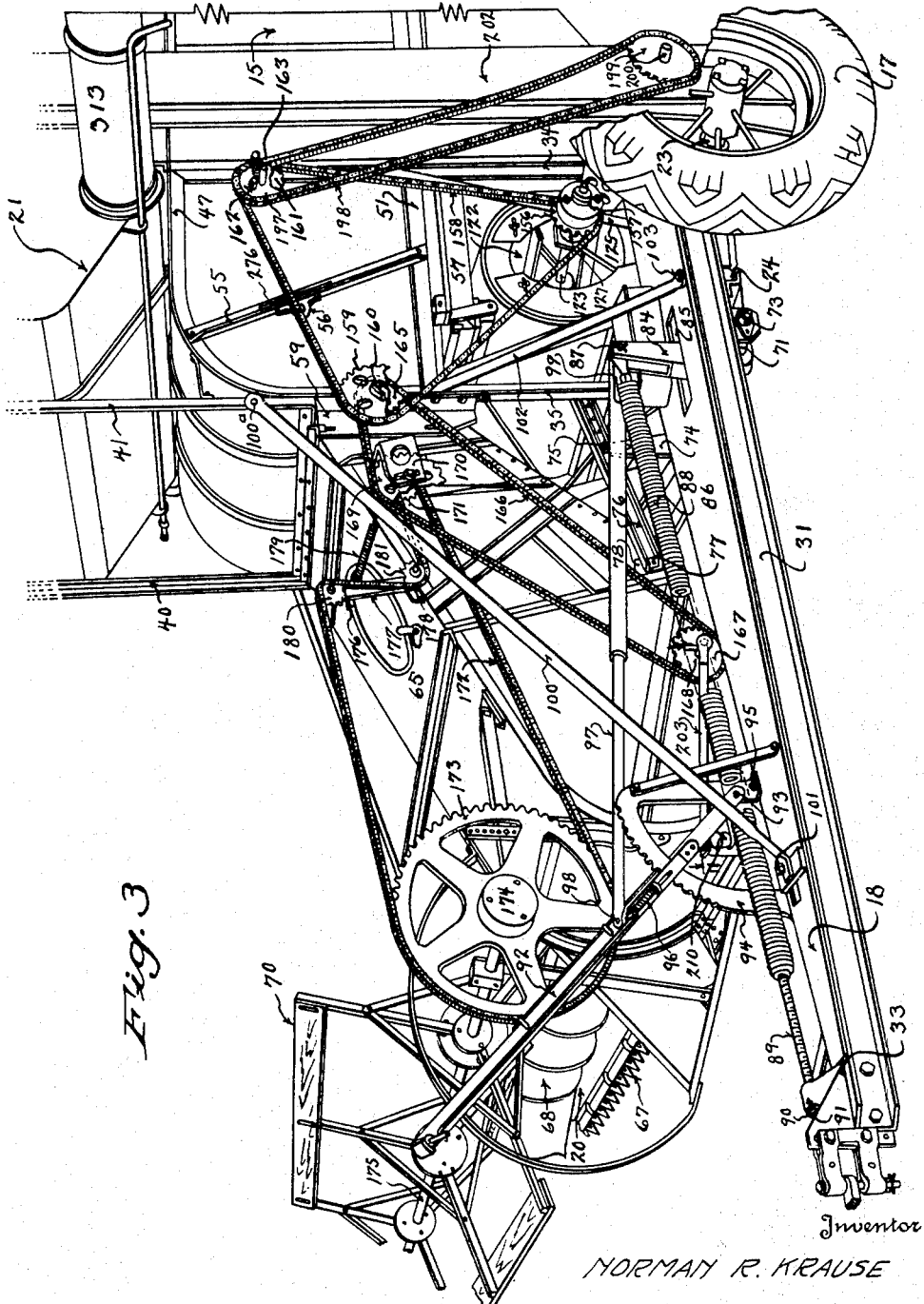
Fig. 3 is a perspective view, slightly enlarged, taken from the left and front of the machine with parts removed.

Torque tube 71 as more particularly seen in Fig. 3, has an arm 84 thereon extending upwardly through an opening 85 in a deck portion 86 of draw bar 18, arm 84 being pivotally connected at 87 with a counterbalancing spring 88 of any suitable or well-known type.

In the present instance a lever 92 is pivoted at 93 to a quadrant 94 suitably fixed at 95 to draw bar 18 and provided with latch mechanism 96 of well-known form for fixing it in desired position on quadrant 94 and a link 97 is pivoted at 98 to lever 92 and connected as by a slot 99 in the present instance to above mentioned pivot 87 on arm 84.

Figure 5:
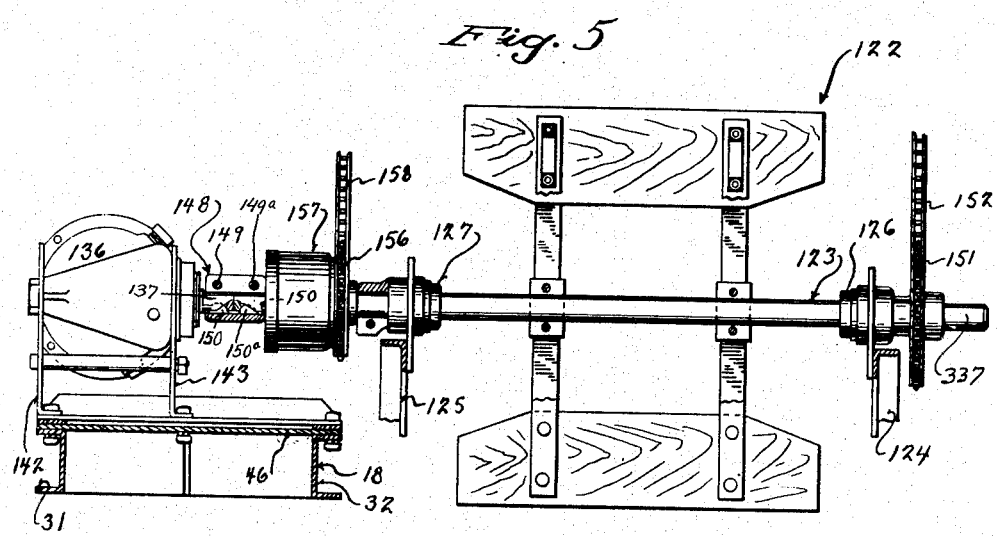
Fig. 5 is a vertical sectional view on the line 5—5 of Fig. 2, slightly enlarged.

A point of novelty resides in the general arrangement of the driving mechanism for the machine. Substantially all threshing machines have a fan of some sort, in the present instance generally designated as 122, Fig. 1, and having a shaft 123 supported on diagonal braces as 124 and 125, Fig. 3. As seen in Fig. 5, bearings of any suitable type as 126 and 127 support fan shaft 123 respectively from braces 124 and 125. Fan shaft 123 is made sufficiently strong to serve as a main power input or countershaft for all the drives on the machine, and, since it also delivers the power to the various components of the machine, may be appropriately described as a power input and output shaft for the entire machine.

Machines of this character are sold both as self-contained, self-operating units, and as units to be operated from a tractor through a power take-off shaft, either of which may serve as a main power source for the machine. These machines are customarily made up in advance of consumer demand and it is difficult to know what percentage will be sold as self-contained and what percentage will be sold as power take-off machines. By virtue of the present invention, the machine may be manufactured complete as far as the power source, and either type of power may be readily added at the time of sale and without any material changes in the manufactured construction. This, as will appear, is accomplished either by connecting a suitable power take-off shaft to one end of fan shaft 123 or by mounting an engine adjacent the opposite end of shaft 123 and connecting a drive from the engine to the shaft, in accordance with the wishes of the purchaser.

Figure 6:
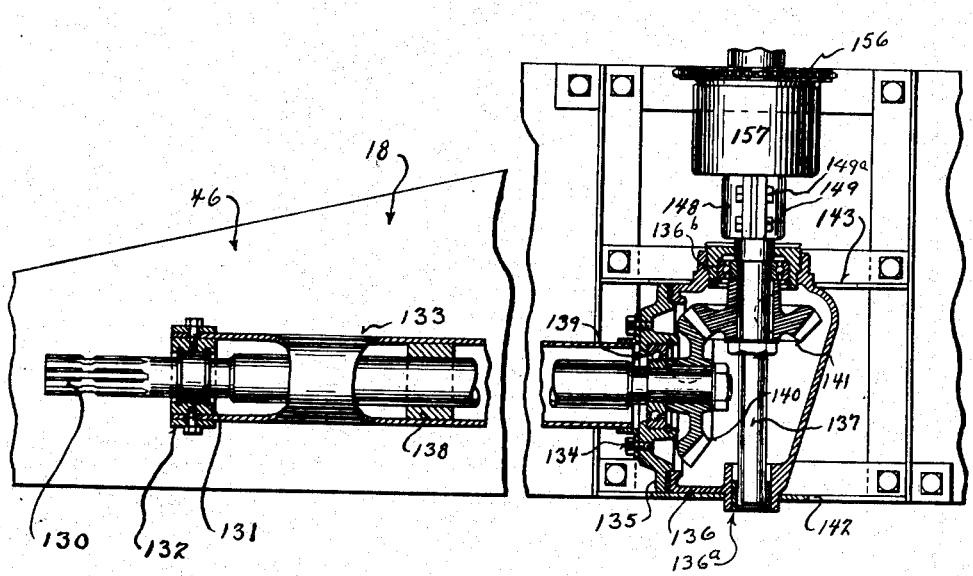
Fig. 6 is a plan view, with parts broken away and in section, of power take-off mechanism indicated in Figs. 1 and 5, slightly enlarged.

Returning first to the power take-off arrangement, as seen in Fig. 1, a stub shaft 128 extends from the rear of tractor 19 and is suitably connected for driving by the tractor engine in well-known manner. Stub shaft 128 connects, through a universal joint shaft of well-known form generally designated as 129, with a power take-off shaft generally designated as 130, supported by a bearing 131 carried by a support 132 on draw bar 18. As more particularly shown in Fig. 6, shaft 130 is enclosed within a torque tube 133 fixed in any suitable manner as by bolts 134 with a cover plate or cap 135 of a housing 136, in which is journaled in suitable bearings as 136a and 136b, a stub shaft 137. Shaft 130 in the present instance is made hollow to reduce weight, and a steady-bearing 138 is provided intermediate the length of shaft 130. In the neighborhood of the inner end of shaft 130 a bearing 139 supports the shaft in desired relation to stub shaft 137. Interengaging gears 140 and 141, respectively, on shafts 130 and 137, communicate the drive from shaft 130 to shaft 137. Housing 136 is suitably supported on draw bar 18, for example being rockingly held in suitable apertures in plates 142 and 143, Fig. 5, the tendency of gear 140 to cause rotation of housing 136 (Fig. 6) about shaft 137, being resisted by torque tube 133. In other words, the torque reaction in housing 136 resulting from the driving force applied to gear 141, reacting against gear 140 is resisted by torque tube 133, which in turn is anchored to support 132.

Above mentioned support 132 is preferably made adjustable in height, as suggested in Fig. 1, to suit various tractors with which the combine may be used or for other reasons. This adjustment is provided without other expedients than the rocking support of housing 136 in plates 142 and 143.

Stub shaft 137, Fig. 5, is united with above mentioned fan shaft 123 in the present instance by means of a coupling 148 clamped about the shafts by bolts or the like 149 and 149A, keys 150 and 150A being interposed respectively between shafts 137 and 123 and the coupling to assure positive driving relation between the shafts and coupling.

A sprocket 151 or the like fixed with shaft 123, in the present instance beyond or outside of bearing 126 drives, through a chain 152 (Fig. 1) and a sprocket 153, a shaft 154, Fig. 2, carrying a threshing cylinder 155.

Returning to Fig. 5, a sprocket 156 forming part of an overload release clutch of well-known construction, generally designated as 157, drives, through a chain 158 as more particularly shown in Fig. 3, a sprocket 159 on a shaft 160 which operates above mentioned feeding apparatus 69 as will appear. Chain 158 also drives a sprocket 161 which actuates an overload release clutch generally designated as 162, and a shaft 163 which actuates a beater 164, Fig. 3. Shaft 160 also has a sprocket 165 which actuates, through a chain 166, a sprocket 167 on a shaft 168 forming the axis of above mentioned auger 68 as will appear.

Chain 166 in the present instance passes over an idler or tightening sprocket 169 adjustably supported in a bracket or the like 170, and sprocket 169 has fixed therewith a sprocket 171 engaged by a chain 172 driving a sprocket 173 which actuates, through an overload release clutch generally designated as 174, a shaft 175 carrying above mentioned reel 70. Chain 172 is maintained in a suitable condition of tension by a tightener generally designated as 176 including a lever 177 pivoted at 178 to a portion of feeder housing 65 and urged rearwardly by a spring or the like 179. Lever 177 carries a sprocket 180 over which passes above mentioned chain 172. A sprocket 181 is journaled in fixed relation in the neighborhood of pivot 178 and beneath which above mentioned chain 172 is directed. From the above, it will be apparent that all of the drives in the machine are actuated from above mentioned fan shaft 123.

Certain other auxiliary drives originate in one or another of the above mentioned shafts, for example, shaft 163 of the above mentioned beater 164 extends entirely through the machine and has a pulley 182, Fig. 1, driving through a belt 183, a pulley 184, suitably journaled on separator housing 15. Pulley 184 is in driving relation with a pulley 185 which drives, through a belt 186, a pulley 187, connected by a shaft 188 with a straw spreader 189, idlers 190 and 191 being supported on housing 15 to provide for carrying belt 186 around the rear of housing 15. Shaft 163 carries also a sprocket 192 driving, through a chain 193 and a sprocket 194, a shaft 195 actuating an unloading auger 196 more particularly shown in Fig. 2.

Other drives to auxiliary and supplementary mechanism originate from above mentioned overload release clutch 157, Fig. 3, but which it is unnecessary to show and describe further as they are of well-known construction and form no part of the present invention, for example, a sprocket 197 driven through above mentioned overload release clutch 162 actuates, through a chain 198, a sprocket 199 on a shaft 200 which actuates in well-known manner clean grain auger 201, Fig. 2, and a clean grain elevator generally designated as 202, Fig. 3.

Above mentioned sprocket 167 also constitutes a crank for a pitman generally designated as 203, which actuates above mentioned cutter bar 67 as shown more particularly in Figs. 7 and 8. Sprocket 167 has fixed therewith a pin 204 on which is suitably retained a bearing 205 which in the present instance is of the anti-friction self-aligning type. A housing 206 fits about bearing 205 and provides an opening 207 for the entrance of pin 204, the opening being of such a size as to allow limited misalignment of housing 206 relatively to pin 204. Housing 206 is fixed with and constitutes part of above mentioned pitman 203.

Pitman 203 as suggested comprises housing 206, a shaft or bar 208 and a clamp or socket 209, the bar and socket being of well-known construction so that it is unnecessary to describe them further.

Socket portion 209 engages a ball element 210, Fig. 9, fixed on a laterally extending arm 211 carried by a sleeve portion 212. Sleeve 212 in the present instance is journaled on a pin or the like 213 supported in a shelf-like element 214 carried by above mentioned housing 65 and a bracket 215, also carried by housing 65. Sleeve 212 also has a generally rearwardly extending arm 216 carrying a ball element 217 embraced by a clamping portion 218 connected with a bar 219 for actuating sickle 220, Fig. 8, bar 219 being united with sickle 220 in any preferred manner as by a clamp or connection 221. Sleeve 212 and its arms 211 and 216 accordingly constitute an offset bell crank which serves to transmit the motion of pitman 203 around the corner of housing 65 to sickle 220.

Sickle 220 forming no part of the present invention need not be further described.

Referring to Fig. 7, shaft 168 constitutes a journal for above mentioned auger 68. In the present instance, shaft 168 does not run entirely through auger 68 but is engaged in a sleeve 222 preferably of angular cross section, carried by spaced plates 223 and 224, sleeve 222 being welded or otherwise suitably fixed with plates 223 and 224 and the whole constituting a spool-like element inserted in the tubular core portion 225 of auger 68, shaft 168 having a portion 168a of a cross section to engage sleeve 222 in driving relation.

Owing to the relatively wide spacing of bearing elements 227 and 228, shaft 168 is very strongly held in desired position against the reactions of pitman 203, bearing 226 being very solidly held by brackets 229, 230, etc. Also, because of the cross section of portion 168a and sleeve 222, auger 68 may be readily disassembled from shaft 168 by a mere endwise movement, shaft 168 remaining in place in bearing member 226. In this way, a rigid connection is provided between shaft 168 and auger 68, core portion 225 being very rugged, and it becomes unnecessary to run shaft 168 through the length of auger 68. Shaft 168 is journaled in a bearing element 226 in the present instance constituting a sleeve-like member carrying anti-friction bearing units generally designated as 227 and 228. Bearing element 226 has upper and lower bracket members 229 and 230 clamped by bolts 231 and 232 against brackets 233 and 234 carried by above mentioned housing 65. Brackets 233 and 234 are spaced somewhat from brackets 229 and 230 and spacers, washers, or the like 235 and 236 are introduced in order to afford a solid structure for engagement by bolts 231 and 232. Vertical adjustment of auger 68 may be accomplished by shifting one or more of washers 235 on to bolt 232 to raise the auger, or shifting one or more of washers 236 on to bolt 231 in order to lower the auger. This adjustment is sometimes needed to compensate for different crops or conditions.

The outer end of auger 68 is preferably made similar, a spool-like element 237 carrying a shaft 238 which is journaled in a bearing of suitable type 239 for supporting the outer end of the auger. As more particularly shown in Figs. 1 and 7, bearing 239 has a flange portion 240 fixed as by bolts 241 with a frame element 242 of harvester portion 20. Bolts 241 may be engaged in one or another of a plurality of holes 243 to obtain desired adjustments of bearing 239. In this manner a secure support for rotatable auger 68 is obtained and at the same time a solid and durable drive for sickle 220.

Figure 4:
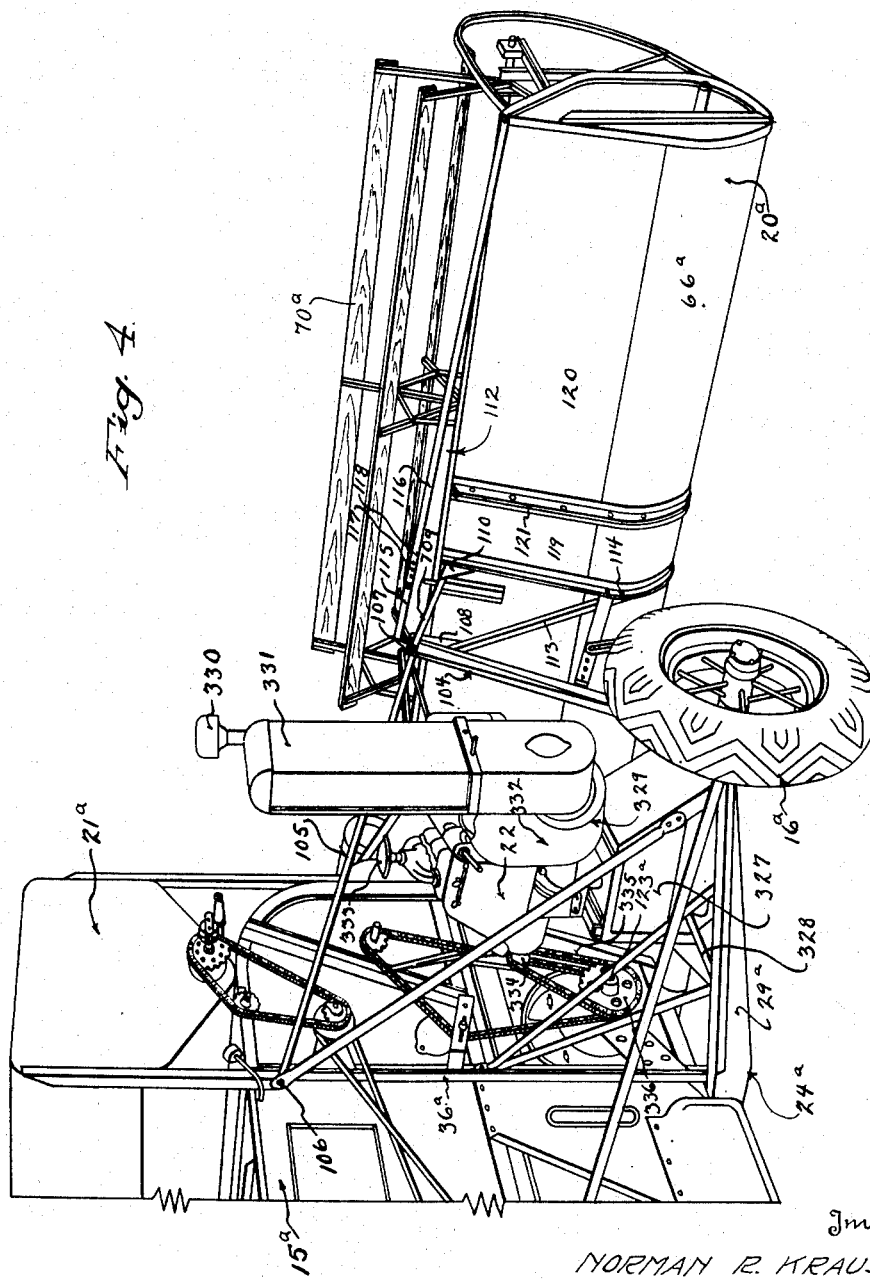
Fig. 4 is a similar view of the same machine taken from a point further to the rear, looking forward and slightly enlarged.

In the event of these machines being used with tractors of limited power they are readily equipped with their own engines as above suggested. Referring to Fig. 4, a base in the present instance comprising a box-like element 327 is mounted on portions 29a and a cross member 328 or other convenient portions of base frame 24a and an engine generally designated as 329 of suitable type forming no part of the present invention is mounted on base member 327. In the present instance engine 329 has a carburetor intake 330, a cooling air intake 331, a flywheel housing 332 and an exhaust outlet 333. Engine 329 also has a sprocket 334 connected by a chain 335 with a sprocket 336 fixed on a portion of a fan shaft 123a corresponding to a portion 337, Fig. 5, of above mentioned fan shaft 123. As above described, motion imparted by engine 329 to fan shaft 123a will be transmitted to all the other working parts of the machine, it being understood that in such instance as when engine 329 is driving fan shaft 123a, the above described power take-off mechanism will be disconnected or omitted entirely from the machine.

It will thus be apparent that it is unnecessary in setting up one of these machines for either power take-off or separate engine drive to disturb any of the drives of the machine in any manner, and while it is contemplated that either one type of drive or the other will ordinarily be supplied, it is entirely within the invention to supply both the engine and the power take-off drive on the same machine, either of which may be used as conditions require.

The operation of the machine is thought to be clear from the above description, no further description thereof being necessary, except to say that the source of power input is connected to the fan shaft, and from which all other drives in the machine originate.

The above being a full and clear description of an illustrative embodiment of the invention, what is claimed as new and desired to be secured by Letters Patent of the United States is:

1. In a harvester-thresher including a harvesting mechanism, a threshing cylinder and separating mechanism, the combination of a driving organization including a cleaning fan, a shaft for said fan comprising a power input and output shaft for the entire machine, a drive from said shaft to said harvesting mechanism, a drive from said shaft to said threshing cylinder, and a drive from said shaft to said separating mechanism, and means on the shaft operably connected to a suitable source of power for driving said shaft, and, through said shaft, said harvesting mechanism, said threshing cylinder and said separating mechanism.

2. In a harvester-thresher including a harvesting mechanism, a threshing cylinder and separating mechanism, the combination of a driving organization including a cleaning fan, a shaft for said fan comprising a power input and output shaft for the entire machine, a drive from said shaft to said harvesting mechanism, a drive from said shaft to said threshing cylinder, and a drive from said shaft to said separating mechanism, and means on the shaft operably connected to a suitable source of power for driving said shaft, and, through said shaft, said harvesting mechanism, said threshing cylinder and said separating mechanism, and additional means on said shaft adapted to be connected to an additional source of power.

3. In a harvester-thresher including a harvesting mechanism, a threshing cylinder and separating mechanism, the combination of a driving organization including a cleaning fan, a shaft for said fan comprising a power input and output shaft for the entire machine, a drive from said shaft to said threshing cylinder, a drive from said shaft to said harvesting mechanism, and a drive from said shaft to said separating mechanism, and means on the shaft operably connected to a suitable source of power for driving said shaft, and, through said shaft, said harvesting mechanism, said threshing cylinder and said separating mechanism, and additional means on said shaft for mounting a driven element for reception of power from another source for driving said shaft.

4. In a harvester-thresher having a drawbar and including a harvesting mechanism, a threshing cylinder and separating mechanism, the combination of a driving organization including a cleaning fan, a shaft for said fan comprising a power input and output shaft for the entire machine, a drive from said shaft to said harvesting mechanism, a drive from said shaft to said threshing cylinder, and a drive from said shaft to said separating mechanism, and means on the shaft operably connected to a suitable source of power for driving said shaft including a housing journaled coaxially with said drive shaft, a gear journaled in said housing, coaxially with and connected to said power input and output shaft, a power take-off shaft journaled in said housing transversely to said power input and output shaft and extending generally in the direction of said drawbar, a gear in said housing on said power take-off shaft meshing with the first mentioned gear and tending by reason of torque reaction therefrom to cause rotation of said housing in a direction opposite to that of said power input and output shaft, a support on said drawbar, and a torque tube enclosing said power take-off shaft, rigidly attached to said housing and anchored to said support at a point spaced from said power input and output shaft in the direction of said power take-off shaft.

5. In a harvester-thresher having a drawbar and including a harvesting mechanism, a threshing cylinder and separating mechanism, the combination of a driving organization including a cleaning fan, a shaft for said fan comprising a power input and output shaft for the entire machine, a drive from said shaft to said harvesting mechanism, a drive from said shaft to said threshing cylinder, and a drive from said shaft to said separating mechanism, and means on the shaft operably connected to a suitable source of power for driving said shaft including a housing journaled coaxially with said power input and output shaft, a gear journaled in said housing, coaxially with and connected to said power input and output shaft, a power take-off shaft journaled in said housing transversely to said power input and output shaft and extending generally in the direction of said drawbar, a gear in said housing on said power take-off shaft meshing with the first mentioned gear and tending by reason of torque reaction therefrom to cause rotation of said housing in a direction opposite to that of said power input and output shaft, a support on said drawbar, and a torque tube enclosing said power take-off shaft, rigidly attached to said housing and anchored to said support at a point spaced from said power input and output shaft in the direction of said power take-off shaft, said support being adjustable in height with accompanying swinging of said torque tube, said power take-off shaft and said housing about the axis of said power input and output shaft.

6. In a harvester-thresher having a drawbar and including a harvesting mechanism, a threshing cylinder and separating mechanism, the combination of a driving organization including a cleaning fan, a shaft for said fan comprising a power input and output shaft for the entire machine, a drive from said shaft to said harvesting mechanism, a drive from said shaft to said threshing cylinder, and a drive from said shaft to said separating mechanism, and means on the shaft operably connected to a suitable source of power for driving said shaft including a housing journaled coaxially with said power input and output shaft, a gear journaled in said housing, coaxially with and connected to said power input and output shaft, a power take-off shaft journaled in said housing transversely to said power input and output shaft and extending generally in the direction of said drawbar, a gear in said housing on said power take-off shaft meshing with the first mentioned gear and tending by reason of torque reaction therefrom to cause rotation of said housing in a direction opposite to that of said power input and output shaft, a support on said drawbar, and a torque tube enclosing said power take-off shaft, rigidly attached to said housing and anchored to said support at a point spaced from said power input and output shaft in the direction of said power take-off shaft, and additional means on said shaft adapted to be connected to an additional source of power.

References Cited in the file of this patent

UNITED STATES PATENTS

| Number | Name | Date |
|---|---|---|
| 803,458 | Zollinger | Oct. 31, 1905 |
| 1,229,738 | Furnas | June 12, 1917 |
| 1,233,135 | Smith | July 10, 1917 |
| 1,475,223 | Cushman | Nov. 27, 1923 |
| 1,896,901 | Knapp et al. | Feb. 7, 1933 |
| 1,910,632 | Paradise et al. | May 23, 1933 |
| 1,926,709 | Bunting | Sept. 12, 1933 |
| 1,959,689 | Ronning | May 22, 1934 |
| 2,169,472 | Oehler et al. | Aug. 15, 1939 |
| 2,378,286 | Cook | June 12, 1945 |
| 2,397,375 | Scranton | Mar. 26, 1946 |
| 2,456,237 | Acton | Dec. 14, 1948 |
| 2,494,388 | Heth | Jan. 10, 1950 |
| 2,510,261 | Sharpe | June 6, 1950 |